United States Patent
Yoshida

(10) Patent No.: US 8,435,697 B2
(45) Date of Patent: May 7, 2013

(54) FUEL CELL SYSTEM WITH PRESSURE REGULATOR AND METHOD FOR DRIVING SAME

(75) Inventor: Noahiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1400 days.

(21) Appl. No.: 10/586,792

(22) PCT Filed: Jan. 18, 2005

(86) PCT No.: PCT/JP2005/000816
§ 371 (c)(1),
(2), (4) Date: Jul. 20, 2006

(87) PCT Pub. No.: WO2005/071784
PCT Pub. Date: Aug. 4, 2005

(65) Prior Publication Data
US 2008/0038593 A1    Feb. 14, 2008

(30) Foreign Application Priority Data

Jan. 22, 2004   (JP) .................................. 2004-014853

(51) Int. Cl.
*H01M 8/04*    (2006.01)
(52) U.S. Cl.
USPC ............................ 429/512; 429/513; 429/514
(58) Field of Classification Search .................. None
See application file for complete search history.

(56) References Cited

U.S. PATENT DOCUMENTS

| | | | |
|---|---|---|---|
| 4,186,707 A * | 2/1980 | Driggers ..................... | 123/512 |
| 5,441,821 A | 8/1995 | Merritt et al. | |
| 5,958,613 A * | 9/1999 | Hamada et al. ............... | 429/26 |
| 6,093,500 A * | 7/2000 | Margiott et al. .............. | 429/429 |
| 6,663,990 B2 * | 12/2003 | Iio et al. ..................... | 429/22 |
| 2003/0096145 A1 | 5/2003 | Sugawara et al. | |
| 2003/0203258 A1 * | 10/2003 | Yang et al. .................. | 429/25 |

FOREIGN PATENT DOCUMENTS

| | | |
|---|---|---|
| JP | A 60-10566 | 1/1985 |
| JP | A 10-511497 | 11/1998 |
| JP | A 2003-68334 | 3/2003 |
| JP | A 2003-157874 | 5/2003 |
| JP | A 2004-95528 | 3/2004 |

OTHER PUBLICATIONS

Human translation of JP 2002-352837, Kazuo Saito, Dec. 6, 2002.*

* cited by examiner

*Primary Examiner* — Barbara Gilliam
*Assistant Examiner* — Kwang Han
(74) *Attorney, Agent, or Firm* — Oliff & Berridge, PLC

(57) ABSTRACT

A fuel system with a high power generation efficiency in which drive means can be reduced in size. The fuel cell system of the present invention is equipped with a fuel cell (FC) for generating power by circulating a fuel gas and comprises a circulation route (R) for circulating the fuel gas, drive means (PM) provided in the circulation route (R) and serving to circulate the fuel gas, and pressure regulating means (RG) for regulating the pressure of the fuel gas in the circulatory route (R). A drive characteristic of the drive means (PM) is determined based on the generated power required for the fuel cell, and the pressure regulation quantity of the pressure regulating means (RG) is determined to make up the deficiency of the drive quantity based on the determined drive characteristic of the drive means (PM).

15 Claims, 10 Drawing Sheets

FUEL CELL SYSTEM WITH PRESSURE REGULATOR AND METHOD FOR DRIVING SAME

TECHNICAL FIELD

The present invention relates to a fuel cell system, and more particularly to the improvement of a control method for reducing power consumption required to drive a fuel cell system when a load is high.

BACKGROUND ART

In fuel cell systems generating power by circulating a hydrogen gas, which is a fuel gas, in a fuel cell, an air supply pressure is controlled according to a power generation quantity of the fuel cell, that is, to load fluctuations, and the amount of consumed hydrogen gas is increased or decreased by changing the rotation speed of a hydrogen pump that causes forced circulation of the hydrogen gas.

For example, Japanese Patent Application Laid-open No. 2003-68334 discloses a method by which the air pressurized in a compressor is introduced into a fuel gas pressure regulating valve and the difference in pressure between the poles of a fuel cell is regulated to be maintained within the prescribed range. The fuel gas is supplied with a hydrogen pump controlled so that the revolution speed thereof increases according to the required output of the fuel cell. A method by which a fuel gas is similarly supplied with a turbine is disclosed in Japanese Patent Application Laid-open No. 60-10566.

However, in the above-described well-known methods, the regulation between the drive quantity of the drive means such as a hydrogen pump or a turbine and the pressure regulation quantity of the circulation route is not considered, and the possibility of adverse effects is especially high when the fuel supply quantity is varied only with the drive means.

Thus, in the drive means such as a pump, because the power consumption of the power source increases with the increase of fuel cell load, the total power generation efficiency of the system tends to degrade when the load is high.

Furthermore, if the fuel supply in a high-load mode of a fuel cell is considered to depend only on the circulation quantity control provided by the drive means, the drive means is required to withstand high-speed rotation and circulate a large amount of fuel gas. For this reason, the drive means has to be increased in size.

DISCLOSURE OF INVENTION

It is an object of the present invention to provide a fuel cell system that has a high power generation efficiency and allows the drive means to be reduced in size.

In order solve the above-described problems, the present invention provides a fuel cell system equipped with a fuel cell for generating power by circulating a fuel gas, the fuel cell system comprising a fuel gas supply source for supplying the fuel gas, a circulation route for circulating the fuel gas supplied to the fuel cell, drive means provided in the circulation route and serving to circulate the fuel gas, and pressure regulating means provided between the fuel gas supply source and the circulation route and serving to regulate a pressure of the fuel gas in the circulation route to the predetermined pressure, wherein the pressure regulating means raises the pressure of the fuel gas in the circulation route according to the increase in the required gas quantity that is required in the fuel cell.

Furthermore, the present invention also provides a fuel cell system comprising a fuel cell for generating power by circulating a fuel gas, a fuel gas supply source for supplying the fuel gas to the fuel cell, a circulation route for circulating the fuel gas supplied to the fuel cell, a drive device provided in the circulation route and serving to circulate the fuel gas, and a pressure regulating device provided between the fuel gas supply source and the circulation route and serving to regulate a pressure of the fuel gas in the circulation route to the predetermined pressure, wherein the pressure regulating device raises the pressure of the fuel gas in the circulation route according to the increase in the required gas quantity that is required in the fuel cell and also inhibits the drive quantity in the drive device.

The present invention also provides a drive method for a fuel cell system equipped with a fuel cell for generating power by circulating a fuel gas, the drive method comprising the steps of estimating a required gas quantity required in the fuel cell and increasing a pressure of the fuel gas in a circulation route, in which the fuel gas supplied to the fuel cell is circulated, according to an increase in the estimated required gas quantity.

In accordance with the present invention, the drive load of the drive means can be adequately regulated by using the pressure of the fuel gas supply source to vary the pressure of the circulation route according to the required gas quantity of the fuel cell and to regulate the gas density in the circulation route. In particular, when the required gas quantity increases, the gas density in the circulation route can be increased by raising the pressure in the circulation route, and an excess increase in the drive load of the drive means can be prevented, thereby making it possible to reduce the drive means in size.

The term "drive means" refers to a structure for forcibly circulating the fuel gas and includes a pump, a compressor, a turbine, and the like.

The term "pressure regulating means" refers to a structure capable of changing and maintaining the pressure in the circulation route and includes a regulating valve (a regulator) and also a reformer or a hydrogen tank capable of regulating the hydrogen generation quantity. A structure is preferred in which power consumption does not increase at least when the fuel gas is supplied under a high pressure.

In accordance with the present invention, at least within a range where the required gas quantity is higher than a standard value, the pressure regulation quantity of the pressure regulating means is varied correspondingly to a variation of the required gas quantity. With such a structure, because the quantity of fuel is regulated by pressure variations of the fuel gas in a range with a high required gas quantity, the drive quantity with the drive means can be relatively reduced, and the power consumption of the drive means, which tends to increase remarkably when the load is high, can be reduced.

The "standard value" in accordance with the present invention can be set arbitrarily with the drive characteristic of the drive means, and it is set to a value such that the consumed power further increases if the increase in the required gas quantity at least in excess of the standard value is to be compensated by the drive of the drive means.

Furthermore, in accordance with the present invention, in a region in which the required gas quantity is higher than the standard value, the variation rate of the drive quantity of the drive means is preferably reduced with respect to a region in which the required gas quantity is lower than the standard value. With such a feature, because the variation rate of the drive quantity of the drive means in a region with a high required gas quantity is lowered, the drive quantity provided by the drive means drops and power consumption of the drive means that tends to increase significantly when the load is high can be decreased.

Here, the aforementioned decrease in the variation rate of the drive quantity includes a case where a positive variation rate decreases gradually, reaching saturation as an asymptote, a case where the variation rate becomes zero (that is, a fixed value), and a case where the variation rate decreases and becomes negative.

In accordance with the present invention, in a region in which the required gas quantity is lower than the standard value, the pressure regulation quantity of the pressure regulating means is preferably maintained equal to or less than a constant value. In a region where the required gas quantity is low, the consumption of fuel gas is low, but if the pressure of the fuel gas in the circulation route increases in this region, the leak (cross leak) of the fuel gas to an air electrode of the fuel gas increases, and the power generation efficiency of the fuel cell decreases. With the aforementioned feature, in a region with a low level of power generation where the consumption of fuel gas is small, the pressure of the fuel gas is maintained equal to or less that a fixed value, thereby preventing the inconvenience of such fuel gas leak.

The "constant value" as referred to herein is selected, for example, such that the fuel gas leak does not occur, even if the consumption quantity of the fuel gas is small.

Furthermore, in accordance with the present invention, the drive means is controlled based on the required gas quantity and a measured value of pressure inside the circulation route. With this feature, if the required gas quantity can be established and the current pressure inside the circulation route can be measured, then an adequate control quantity of the drive means can be determined, so as to demonstrate the operation effect of the present invention.

In accordance with the present invention, when the required gas quantity rises, the gas density inside the circulation route can be increased by increasing the pressure inside the circulation route, and the drive load of the drive means can be prevented from becoming too high. Therefore, the drive means can be reduced in size the power generation efficiency of the entire fuel cell system can be increased.

BEST MODE FOR CARRYING OUT THE INVENTION

The preferred mode for carrying out the invention will be described below with reference to the appended drawings.
(Explanation of Principle)

The operation principle of the present invention will be described below with reference to FIG. 1 and FIG. 2.

Figure 1:
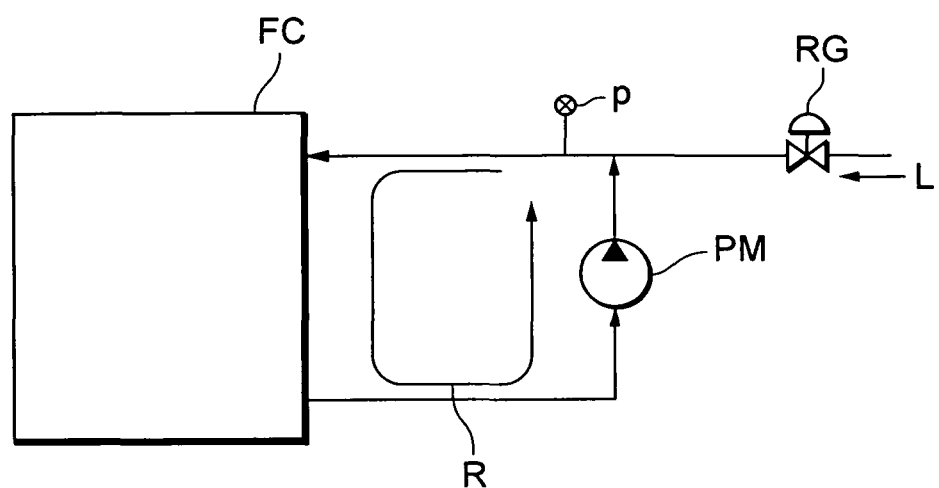
FIG. 1 is a block diagram illustrating the principle of the present invention.

As shown in FIG. 1, in accordance with the present invention, a circulation route R is formed for supplying a fuel gas L to a fuel cell FC. Drive means (hydrogen pump) PM for forcibly circulating the fuel gas L is provided in the circulation route R. The pressure p of the circulation route R is regulated with pressure regulating means (regulating valve) RG. The drive characteristic of the drive means PM is determined based on the power (load) which is required to be generated by the fuel cell FC, and the pressure regulation quantity of the pressure regulating means RG is determined so as to make up the deficiency of the drive quantity based on the determined drive characteristic of the drive means PM.

Figure 2A:
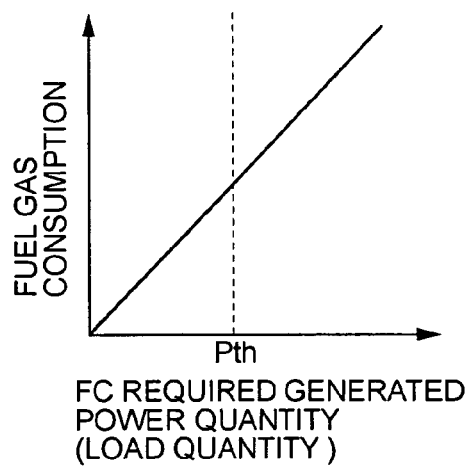
FIG. 2A illustrates the relationship between a fuel gas consumption quantity and a required load that explains the control method of Embodiment 1 of the present invention.

FIG. 2A illustrates the relationship between a consumed quantity of fuel gas and a required load of a fuel cell. Because the reverse reaction of water electrolysis is induced in a fuel cell, hydrogen gas, which is a fuel gas, is supplied to a fuel electrode, which is a negative electrode (cathode), a gas (air) containing oxygen is supplied to an air electrode, which is a positive electrode (anode), the reaction represented by Formula (1) is induced on the fuel electrode, the reaction represented by Formula (2) is induced on the air electrode, electrons are caused to circulate, and an electric current is induced.

$$H_2 \rightarrow 2H^+ + 2e^- \quad (1)$$

$$2H^+ + 2e^- + (1/2)O_2 \rightarrow H_2O \quad (2)$$

In other words, the amount of electron generated corresponds with the amount of hydrogen gas supplied and it is expected that the relationship as shown in FIG. 2A is required.

Figure 2B:
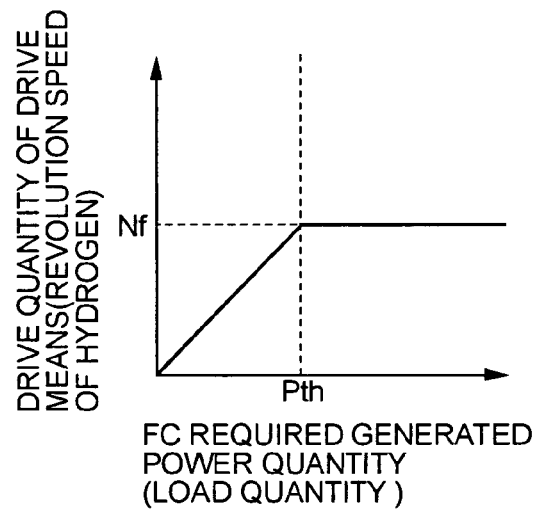
FIG. 2B is a control characteristic of pump revolution speed vs. required load.
Figure 2C:
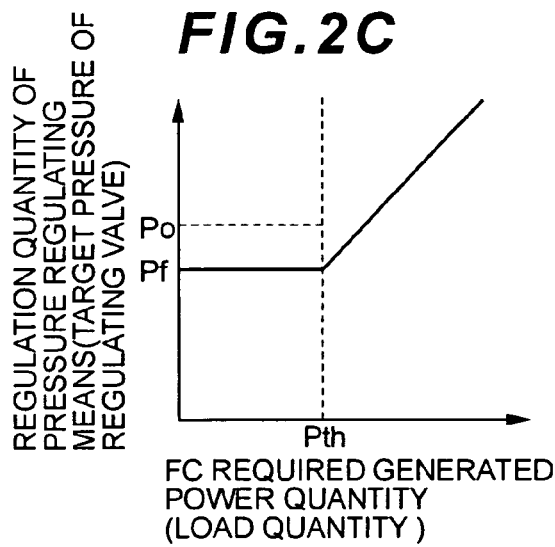
FIG. 2C is a control characteristic of target pressure of regulating valve vs. required load.

FIG. 2B shows an example of the drive characteristic of the drive means PM, and FIG. 2C shows an example of the regulation quantity of the pressure regulating means RG conducting the regulation so as to make up the deficiency of the drive quantity of the drive means PM. With the fuel quantity control method of the conventional fuel cell systems, the control is conducted, for example, in a region below a standard value Pth shown in FIGS. 2B and C. In other words, the pressure p of the circulation route R is maintained at a constant level (FIG. 2C), and mainly the drive quantity of the drive means PM, for example, the revolution speed of the hydrogen pump is increased or decreased in response to load fluctuations in the fuel cell FC.

By contrast, with the drive method in accordance with the present invention, a required gas quantity, which is required in the fuel cell FC, is estimated and the pressure of the fuel gas in the circulation route R where the fuel gas supplied to the fuel cell FC is circulated is increased according to the increase of the estimated required gas quantity. Thus, the drive characteristic of the drive means PM is initially determined depending on the value of the generated power, in this case, depending on whether or not the generated power is larger than the standard value Pth.

Figure 12:
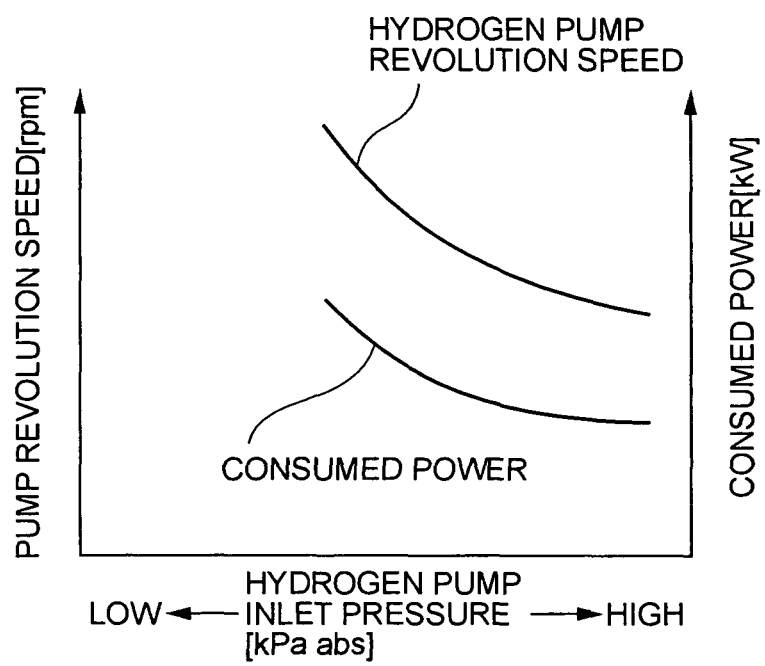
FIG. 12 illustrates the relationship between the hydrogen pump inlet pressure, pump revolution speed, and consumed power.

FIG. 12 shows the relation between the inlet pressure of the hydrogen pump (that is, a value corresponding to the pressure of the circulation route), the pump revolution speed (that is, the drive quantity of the drive means), and the power consumed thereby in the case where the circulation quantity of the hydrogen gas, which is the fuel gas, is constant. As follows from FIG. 12, when the pressure in the circulation route rises, the revolution speed of the hydrogen pump, which is the drive means, decreases, and when the revolution speed of the hydrogen pump is low, the power consumed thereby also tends to decrease.

Accordingly, in accordance with the present invention, as shown in FIG. 2B, in a high-load region, the drive quantity of the drive means PM is set to be constant (for example, the revolution speed of the hydrogen pump is constant). In other words, if the drive means is in a high-drive state (for example, the revolution speed of the hydrogen pump is high), the power consumption tends to increase. Therefore, the drive state is prevented from being too high in a region with a high generated power. On the other hand, in the case where the drive quantity of the drive means is suppressed, some compensation is necessary to make up the reduced circulation quantity of the fuel gas that has to be supplied. Thus, in accordance with the present invention, the pressure regulating means RG regulates the pressure so as to make up the deficiency of the drive quantity provided by the drive means PM. In other words, as shown in FIG. 2C, the regulation is performed so that the pressure provided by the pressure regulating means RG rises correspondingly to the increase in the generated power so as to make up the deficiency of the drive quantity provided by the drive means that is driven at a constant quantity.

More specifically, in a region where the generated power is higher than the standard value Pth (the region on the right side of Pth), the variation rate of the drive quantity of the drive means PM is decreased with respect to that in a region where the generated power is less than the standard value Pth (the region on the left side of Pth) (FIG. 2B). Furthermore, in the region where the generated power is higher than the standard value Pth (the region on the right side of Pth), the pressure regulation quantity of the pressure regulating means RG is changed according to the change of the generated power (FIG. 2C). With the above-described control method, the operation state of the drive means PM can be changed by the value of generated power. Therefore, the drive quantity or drive capacity of the drive means PM can be adapted to load fluctuations of the fuel cell FC, without being critically increased, power consumption of the drive means PM can be decreased, and the drive means PM can be reduced in size.

Here, the standard value Pth of generated power that switches the control state depends greatly on the drive characteristic of the drive means, but if the increase of generated power in excess of the standard value is to be compensated by the drive of the drive means PM, the standard value may be set to a value at which the consumed power increases rapidly.

Furthermore, in a region where the generated power is less than the standard value Pth (the region to the left of Pth), as shown in FIG. 2C, the pressure regulation quantity of the pressure regulating means RG is so controlled as to be maintained equal to or less than a constant value PO. Such control can prevent the leak (cross leak) of the fuel gas to the air electrode of the fuel gas. The value PO is such that the leak (cross leak) of the fuel gas does not occur even in a region where the consumed quantity of fuel gas is small.

However, it is not necessary to regulate the pressure regulation quantity based on the standard value, and a configuration in which pressure regulation is conducted in a simple manner according to the load quantity of the fuel cell will suffice. A mode for carrying out the invention without using the standard value will be explained below as Embodiment 1, and a mode using the standard value will be explained in Embodiment 2 and subsequent embodiments.

Embodiment 1

Figure 3:
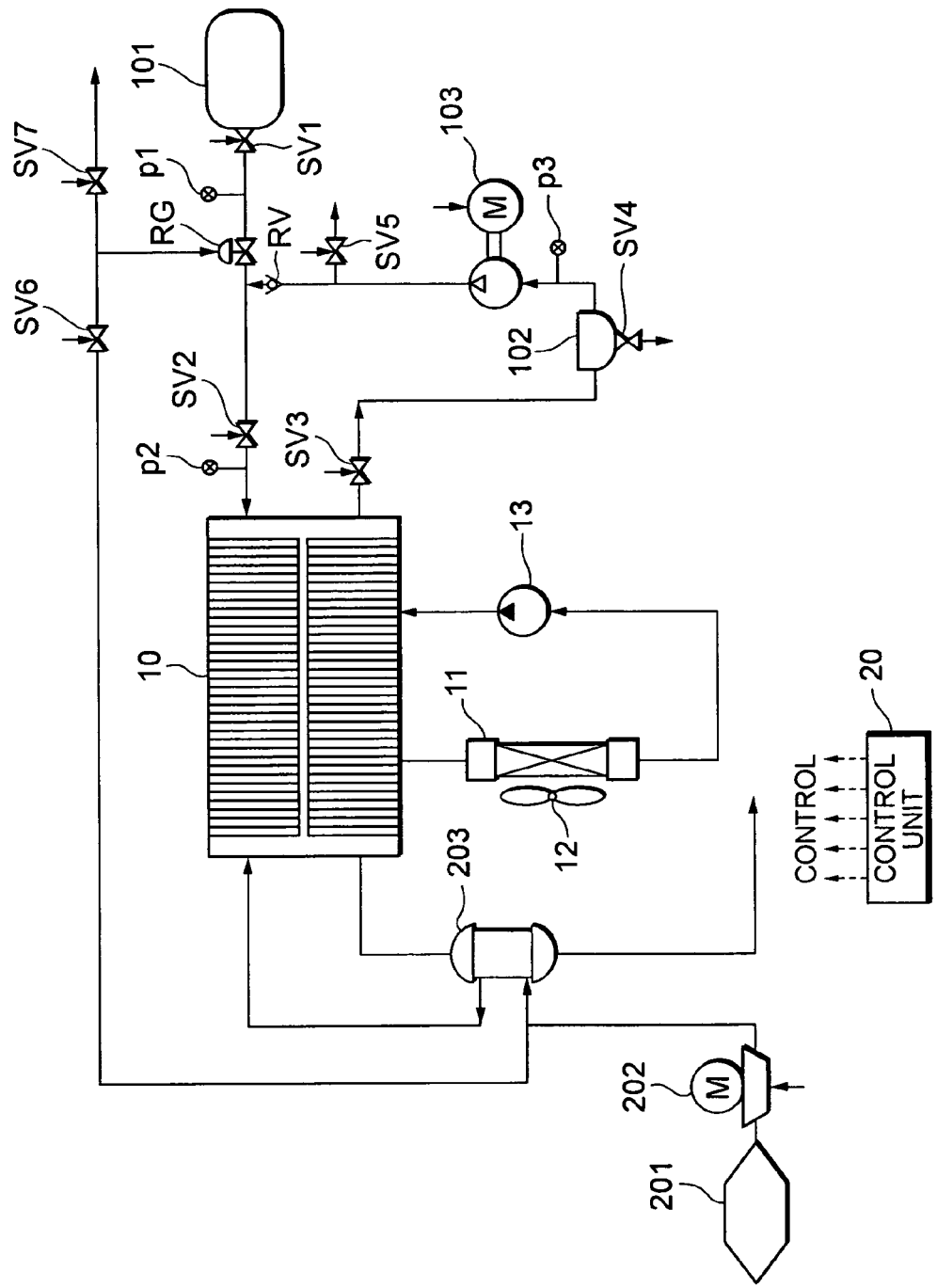
FIG. 3 is a block diagram of the fuel cell system of Embodiment 1.

Specific embodiments of the present invention based on the above-described principle will be explained below. The embodiments of the present invention relate to the application of the control method in accordance with the present invention to fuel cell systems installed on mobile structures such as electric automobiles. FIG. 3 shows the present fuel cell system in its entirety. The below-described embodiment is merely one mode for implementing the present invention, and the present invention can be employed without being limited thereto.

As shown in FIG. 3, the fuel cell system comprises a system for supplying a hydrogen gas, which is a fuel gas, to a fuel cell stack 10, a system for supplying air, which is an oxygen source, and a system for cooling the fuel cell stack 10.

The fuel cell stack 10 has a stack structure having stacked therein a plurality of separators having channels for hydrogen gas, air, and cooling liquid and cells, each comprising a MEA (Membrane Electrode Assembly) sandwiched between a pair of separators. The MEA has a structure in which a polymer electrolyte membrane is sandwiched between two electrodes: a fuel electrode and an air electrode. In the fuel electrode, a catalyst layer for the fuel electrode is provided on a porous support layer. In the air electrode, a catalyst layer for the air electrode is provided on a porous support layer.

The system for supplying the hydrogen gas to the fuel cell stack 10 comprises (in the order of description from the hydrogen gas supply source) a hydrogen tank 101, a shut-off valve SV1, an regulating valve RG, a shut-off valve SV2, a shut-off valve SV3 via the fuel cell stack 10, a gas-liquid separator 102, a shut-off valve SV4, a hydrogen pump 103, a shut-off valve SV5, and a return check valve RV. The regulating valve (regulator) RG is equivalent to the pressure regulating means of the present invention, and the hydrogen pump 103 is equivalent to the drive means of the present invention. The circulation route in accordance with the present invention is composed of a route comprising the shut-off valve SV2, fuel cell stack 10, SV3, gas-liquid separator 102, hydrogen pump 103, and return check valve RV. The pressure regulation quantity control of the regulating valve RG is conducted by driving a compressor 202 with a control unit 20 and operating the shut-off valves SV6 and SV7. Thus, by opening the shut-off valve SV6, the air pressure supplied to the regulating valve RG can be raised and the pressure supplied to the circulation route of the fuel cell can be raised. Furthermore, by opening the shut-off valve SV7, the air pressure supplied to the regulating valve RG can be lowered and the pressure supplied to the circulation route of the fuel cell can be lowered. Thus controlling the shut-off valves SV6 and SV7 enables a random control of the pressure supplied to the circulation route. The control of the drive quantity of the hydrogen pump 103 is conducted by controlling the drive quantity of the hydrogen pump 103 with the control unit 20.

The hydrogen tank 101 is filled with high-pressure hydrogen gas. The hydrogen supply source of the present embodiment may have any configuration, provided that it can supply hydrogen gas, which is the fuel gas, so that the pressure downstream of the regulating valve RG can be maintained at a predetermined level. Therefore, various modifications of the hydrogen supply source are possible. Thus, a hydrogen tank using a hydrogen absorption alloy, a high-pressure hydrogen tank that does not have a hydrogen absorption function, a hydrogen supply mechanism using a reformed gas, and a structure supplying hydrogen from a liquid hydrogen tank may be used instead of the high-pressure hydrogen tank.

As for the hydrogen gas from the hydrogen tank 101, first, whether or not to supply the hydrogen gas is selected with the shut-off valve SV1 and the hydrogen gas is discharged downstream under a pressure determined by the regulating valve RG. The regulation quantity of the regulating valve RG, that is, pressure regulation is determined by the operation state of the compressor 202 on the air electrode side. The gas pressure downstream of the regulating valve RG is set according to the air pressure applied to the control unit of the regulating valve RG. The shut-off valves SV2 and SV3 are shut in the power generation stop or intermittent operation mode of the fuel cell system and open in the normal operation mode. The gas-liquid separator 102 removes moisture and other impurities generated by the electrochemical reactions proceeding in the fuel cell stack 10 during normal operation from the hydrogen off-gas and discharges them to the outside via the shut-off valve SV4. The hydrogen pump 103 forcibly circulates the hydrogen gas in the circulation route of the hydrogen gas based on the control of the control unit 20. The shut-off valve SV5 is open during purging, but shut down in the usual operation mode or during gas leak estimation in accordance with the present invention. The return check valve RV prevents the return flow of the hydrogen gas. The hydrogen off-gas purged from the shut-off valve SV5 is treated with an exhaust gas system comprising a diluting device (not shown in the figure).

An air cleaner 201, the compressor 202, and a humidifier 203 are provided as a system for supplying air to the fuel cell stack 10. The air cleaner 201 purifies the external air and introduces it into the fuel cell system. The compressor 202 compresses the introduced air according to the control of the control unit 20 and changes the quantity and pressure of the supplied air. The humidifier 203 performs moisture exchange between the compressed air and the air off-gas to provide the compressed air with an appropriate humidity. Part of the air compressed with the compressor 202 is supplied to a fuel system, and the air pressure in the space between the shut-off valves SV6 and SV7 is applied to the regulating valve RG. The air off-gas discharged from the fuel cells tack 10 is discharged to an exhaust system comprising a diluting device (not shown in the figure).

The cooling system of the fuel cell stack 10 comprises a radiator 11, a fan 12, and a cooling pump 13. In this system, a liquid coolant is circulated inside the fuel cell stack 10.

The control unit 20 is a well-known computer system such as an ECU (Electric Control Unit). If a CPU (central processing unit), which is not shown in the figure, successively executes a software program for implementing the present invention that is stored in a ROM (not shown in the figure), this computer system can be operated as a control device in accordance with the present invention. Thus, according to the below-described procedure (FIG. 4), the control unit 20 determines the required generated power of the fuel cell stack 10, determines the pressure regulation quantity of the regulating valve RG based on the required generated power, and controls the drive quantity of the hydrogen pump 103 so as to make up the deficiency of the pressure regulation quantity.

Figure 4:
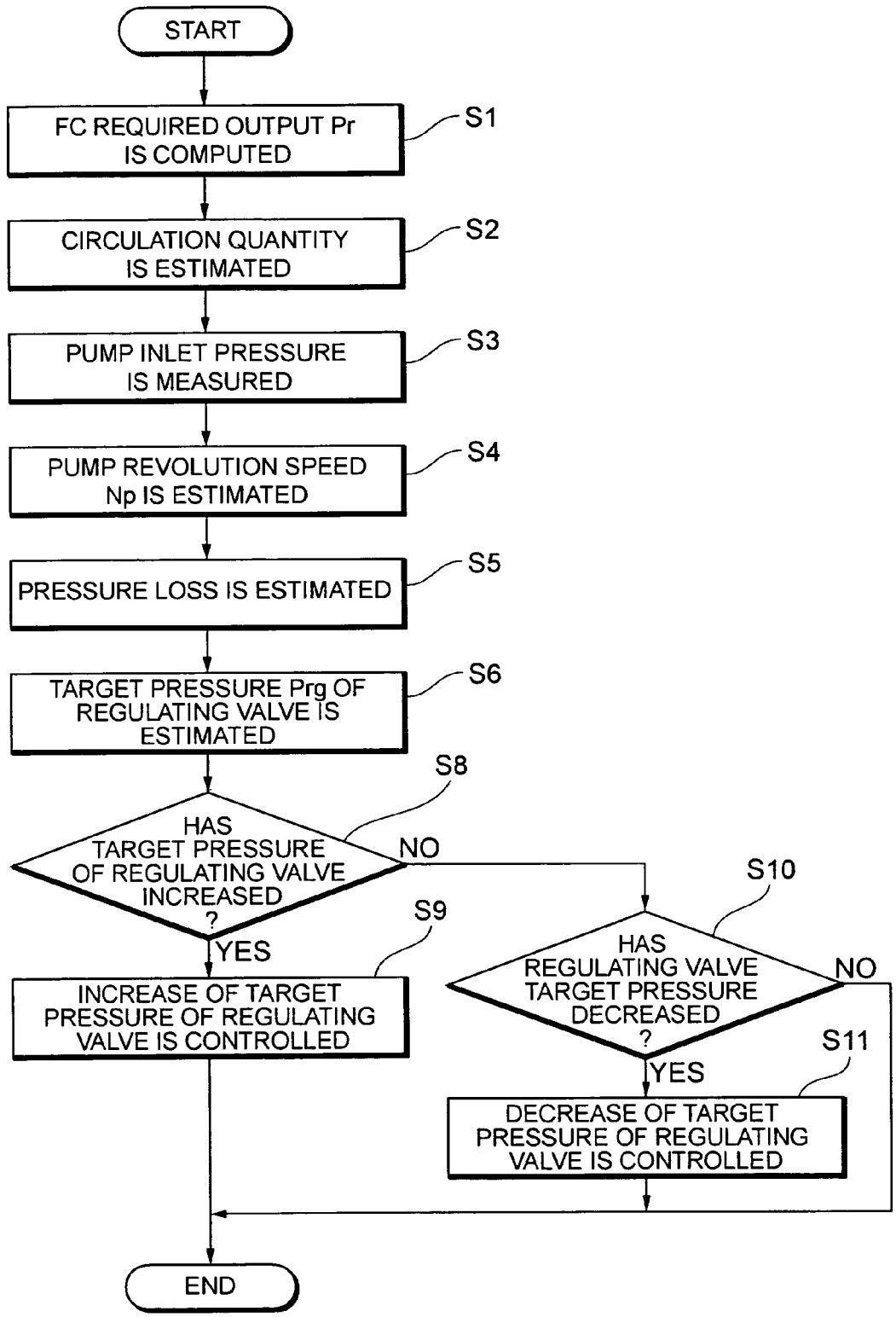
FIG. 4 is a flowchart illustrating the control method of the fuel cell system of Embodiment 1.

The operation in Embodiment 1 will be explained below with reference to a flowchart shown in FIG. 4. This flow chart illustrates the implementation of the method for driving the fuel cell system in accordance with the present invention. Thus, in this flowchart, a required gas quantity that is required for the fuel cell stack 10 is estimated, and the pressure of the fuel gas in the circulation route where the fuel gas supplied to the fuel cells tack 10 is circulated is raised according to the increase in the estimated required gas quantity. This flowchart is repeatedly executed in appropriate intervals during normal operation.

When the fuel cell system operates normally, the control unit 20 opens the shut-off valve SV1 and supplies the hydrogen gas correspondingly to the predetermined flow rate of the hydrogen gas from the hydrogen tank 101. The regulating valve RG can regulate the pressure in the downstream circulation route by the pressure of air applied to the diaphragm. This regulation quantity is determined by the air pressure controlled by the shut-off valves SV6 and SV7.

The quantity of hydrogen gas supplied to the fuel cell stack 10 is set by the pressure of the circulation route that is set by the regulation of the regulating valve RG and the circulation quantity determined by the revolution speed of the hydrogen pump 103. The respective values are determined by the control method in accordance with the present invention that is described hereinbelow.

First, the control unit 20 computes the generated power Pr required for the fuel cell stack 10 based on the load quantity required for the fuel cell system (S1). In order to find the load of the fuel cell, the control unit 20 refers to an accelerator position, shift position, and brake position and computes the torque that has to be outputted by a power motor (not shown in the figure). Then, the control unit 20 adds the power loss in an inverter or a converter (not shown in the figures) and the power consumed by auxiliary equipment to the load quantity of the motor torque and determines the required generated power Pr that is required for the entire system.

Figure 5:
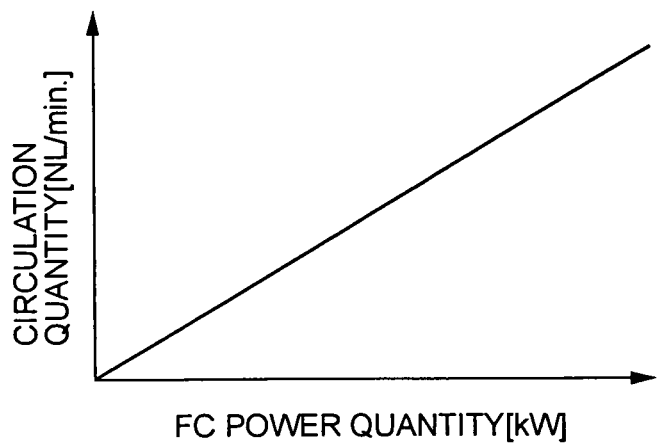
FIG. 5 is a characteristic diagram of gas circulation quantity vs. quantity of power generated in the fuel cell.

The control unit 20 then finds in the following manner a target pressure Prg in the circulation route that has to be regulated by the regulating valve RG. First, as shown in FIG. 5, if the generated power of the fuel cell is established, the circulation quantity of the hydrogen gas that is necessary for power generation at this generated power is established. Here, the control unit 20 determines the required circulation quantity of the hydrogen gas by referring to a table (for example, FIG. 5) representing the relationship between the required generated power Pr of the fuel cell and the circulation quantity of the hydrogen gas (S2). The control unit 20 stores the relationship such as shown in FIG. 5 as a data table. Because the relationship shown in FIG. 5 is a proportional relationship, it may be stored in the form of a correlation formula, rather than the table data, and the circulation quantity may be found by computation.

Figure 6:
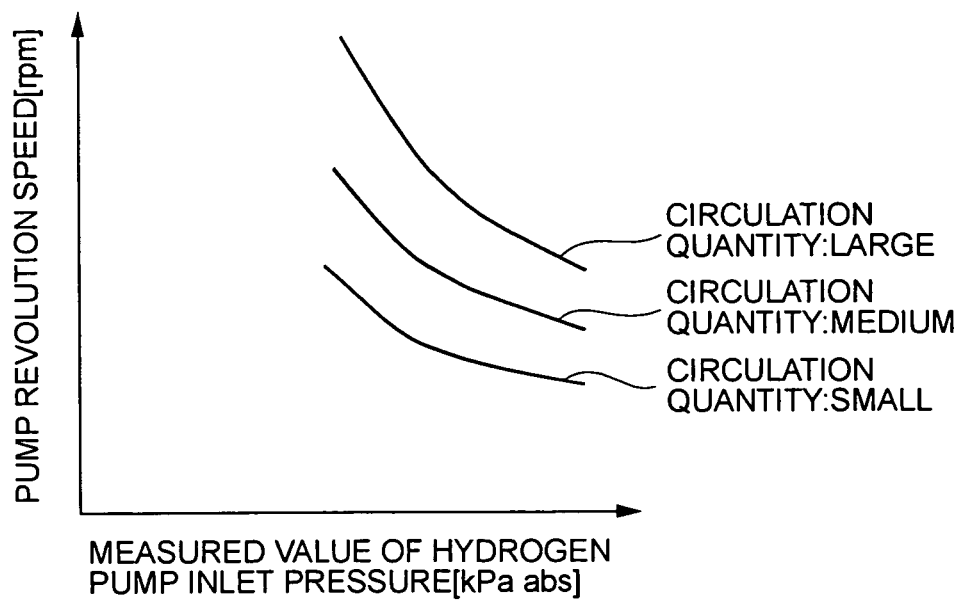
FIG. 6 illustrates the relationship between a pump revolution speed and an inlet pressure of a hydrogen pump.

Furthermore, as shown in FIG. 6, if the target circulation quantity is established, the target revolution speed required for the hydrogen pump according to the inlet pressure of the hydrogen pump is established. Accordingly, the control unit 20 measures the inlet pressure of the hydrogen pump 103 with reference to a detection signal of a pressure sensor P3 (S3).

Then, the control unit 20 finds the target revolution speed $N_p$ necessary for the hydrogen pump 103 based on the measured value of the inlet pressure of the hydrogen pump 103 and the target circulation value, for example, by referring to the data table illustrating the characteristic shown in FIG. 6 (S4). The relationship table such as shown in FIG. 6 is prepared according to the circulation quantity.

Figure 7:
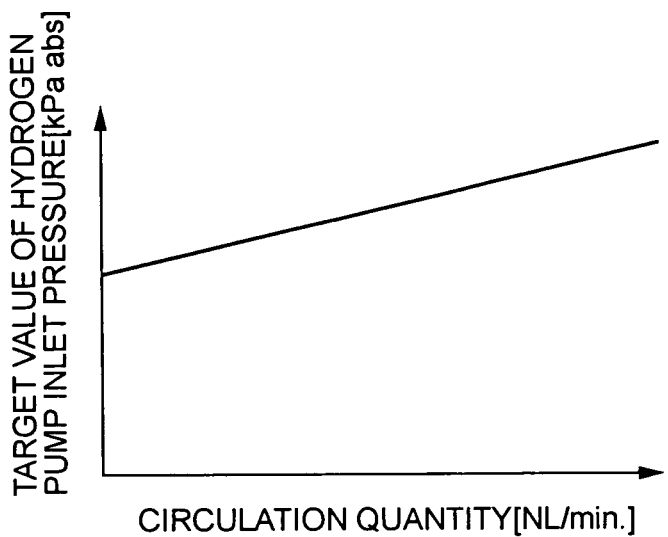
FIG. 7 is a characteristic diagram of hydrogen pump inlet pressure vs. circulation quantity.

Here, if the circulation quantity is established, the target value of the inlet pressure of the hydrogen pumps is theoretically established by the relationship shown in FIG. 7. However, because pressure loss is caused by channel resistance in the circulation route from the vicinity of the outlet of the hydrogen pump 103 that is regulated by the actual regulating valve RG to the inlet of the hydrogen pump, the target pressure control has to be conducted by taking this pressure loss into account. For this reason, the pressure of the circulation route that has to be regulated with the regulating valve RG is obtained by adding the pressure loss to the inlet pressure of the hydrogen pump.

Figure 8:
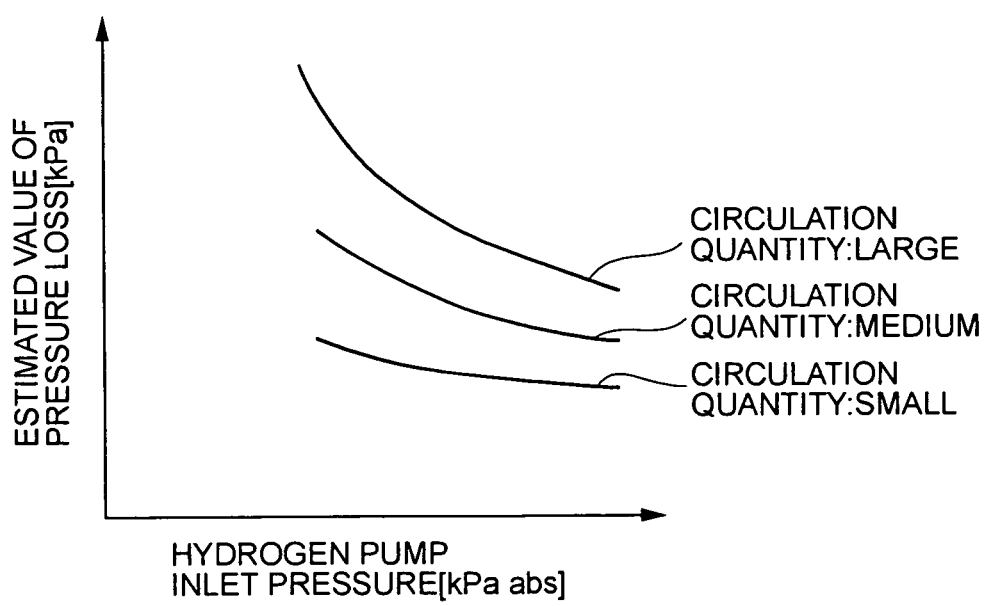
FIG. 8 is a diagram for estimating pressure loss vs. hydrogen pump inlet pressure.

Accordingly, in order to fine the pressure loss, the control unit 20 finds the target value (theoretic value) of the inlet pressure of the hydrogen pump 103 corresponding to the required circulation quantity obtained in step S2, by referring to the relationship table corresponding to the characteristic shown in FIG. 7. If the inlet pressure of the hydrogen pump and the circulation quantity are established as shown in FIG. 8, the pressure loss occurring in the circulation route from the outlet to the inlet of the hydrogen pump 103 is established. Accordingly, the control unit 20 finds the pressure loss generated by the required circulation quantity with respect to the target value of the inlet pressure of the hydrogen pump 103, by referring to the relationship table corresponding to the characteristic shown in FIG. 8, based on the target value of the inlet pressure of the hydrogen pump 103 and the required circulation quantity (S5).

The value obtained by adding up the pressure loss and the inlet pressure of the hydrogen pump becomes the target pressure Prg that has to be regulated by the regulating valve RG. Accordingly, the control unit 20 calculates the value obtained by adding this estimated value of pressure loss to the target value of the inlet pressure of the hydrogen pump 103 as the target pressure Prg (S6).

The control unit 20 outputs a drive signal, such that driving be conducted at a target revolution speed Np that was found in step S4, to the hydrogen pump 103 and also controls the shut-off valves SV6 and SV7 so that the pressure in the circulation route, which is regulated with the regulating valve RG, becomes the target pressure Prg.

Here, when the load fluctuates and a variation occurs in the required generated powder that has to be generated by the fuel cell stack 10, the fluctuation of the generated power has to be regulated by increasing or decreasing the circulation quantity of the hydrogen pump 103 if the pressure in the circulation route is to be prevented from changing. In particular, an undesirable consequence of increasing the revolution speed of the hydrogen pump is the increase in power consumption. In this regard, in accordance with the present invention, the increase in power consumption of the hydrogen pump can be prevented by adapting to load fluctuations by varying the target pressure Prg, which is regulated with the regulating valve RG, rather than by changing the revolution speed of the hydrogen pump.

Thus, when the pressure rises (S8: YES) with respect to the target pressure Prg that has already been regulated by the previous processing, the control unit 20 regulates the shut-off valves SV6 and SV7 in the direction of increasing the target pressure Prg, which is regulated with the regulating valve RG, and obtaining a new target pressure that was found in step S6 (S9).

On the other hand, when the pressure drops (S8: NO, S10: YES) with respect to the target pressure Prg that has already been regulated by the previous processing, the control unit 20 regulates the shut-off valves SV6 and SV7 in the direction of decreasing the target pressure Prg, which is regulated with the regulating valve RG, and obtaining a new target pressure that was found in step S6 (S11).

When the target pressure Prg that has been regulated by the previous processing does not change (S8: NO, S10: NO), the update of a new control signal is not particularly necessary. Therefore, the control unit 20 does nothing.

The control unit 20 performs a feedback control so as to maintain a set target pressure Prg by referring to the actual pressure in the circulation route that is detected by a pressure sensor p2.

In the above-described Embodiment 1, the target pressure of the circulation route is controlled according to the variation of the required gas quantity (circulation quantity) that follows the change in the required generated power Pr. Therefore, the fluctuation of power consumption can be inhibited without compensating the fluctuation of load with a revolution speed control of the hydrogen pump 103.

In particular, when the circulation quantity increases, it is possible to adapt to the fluctuation of load, without increasing the revolution speed of the hydrogen pump. Therefore, power consumption can be reduced and the total power generation efficiency can be increased. Furthermore, because a low revolution speed can be maintained, the hydrogen pump can be reduced in size and the entire fuel system can be provided in a compact configuration.

Embodiment 2

Figure 9:
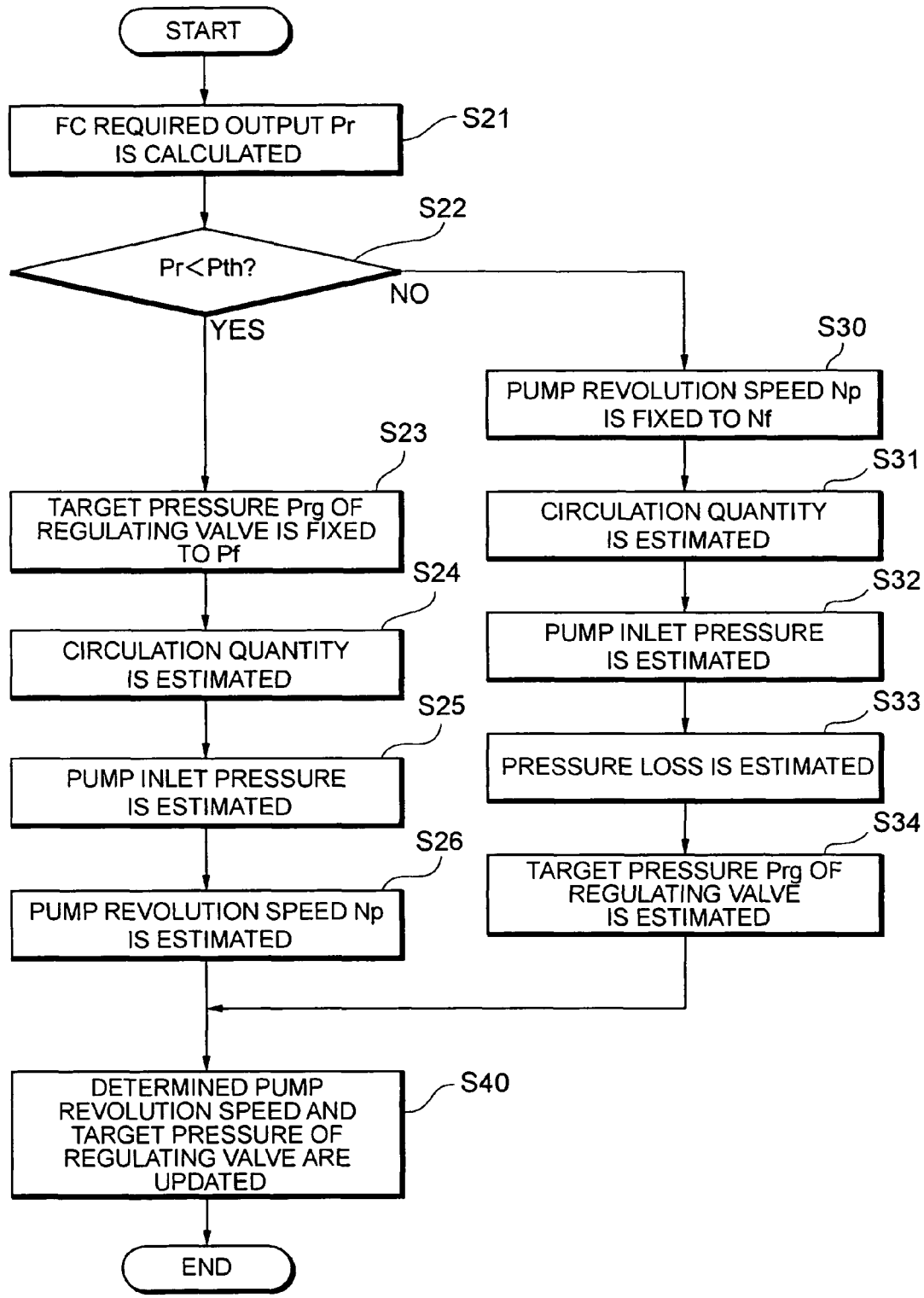
FIG. 9 is a flowchart illustrating the control method of the fuel cell system of Embodiment 2.

Embodiment 2 of the present invention relates a mode in which the system control of the fuel cell system identical to that of Embodiment 1 described hereinabove is changed depending on whether or not the required output is higher than a standard value. FIG. 9 shows a flowchart explaining the operation of Embodiment 2.

First, the control unit 20 computes the generated power Pr required for the fuel cell stack 10 based on the load quantity required for the fuel cell system, in the same manner as in Embodiment 1 (S21).

The control unit 20 then compares the required generated power Pr with a standard value Pth shown in FIG. 2 (S22). When the required generated power Pr is less than the standard value Pth, the hydrogen pump 103 does not increase significantly the consumption of power in response to load fluctuations. Accordingly, the control unit 20 fixes the target pressure Prg of the regulating valve RG and maintains it at an appropriate pressure Pf attained when the required generated power Pr is the standard value Pth (S23).

The revolution speed of the hydrogen pump 103 is computed in the same manner as that of Embodiment 1. First, if the target pressure of the circulation route is established, the target circulation quantity is determined from the relationship (for example, shown in FIG. 5) between the required generated power Pr of the fuel cell and the circulation quantity necessary for the hydrogen pump 103 under the target pressure (S24).

Further, because the target value of the inlet pressure of the hydrogen pump 103 is uniquely determined, as shown in FIG. 7, with respect to the established circulation quantity, the control unit 20 determines the target value of the inlet pressure of the hydrogen pump 103 based on the data table or formula representing this relationship (S25). The control unit 20 then finds the required target revolution speed Np necessary for the hydrogen pump 103 by referring to the data table representing the characteristic, for example, such as shown in FIG. 6, based on the circulation quantity and inlet pressure of the hydrogen pump 103 that were thus found (S26).

With the above-described processing, after the target pressure Prg in the circulation route has been set to a constant value Pf, the revolution speed Np required for the hydrogen pump 103 is found correspondingly to the required generated power Pr for each interval. The control unit 20 updates the control signal so that the system is driven at this target revolution speed Np and the target pressure Pf in the circulation route (S40). With such processing, the fuel cell system is controlled in a region on the left side of the standard value Pth shown in FIGS. 2A-C.

Further, the required generated power Pr in the fuel cell is compared with the standard value Pth in step S22, and when the required generated power Pr is equal to or higher than the standard value Pth (NO), the power consumption can increase significantly, if the revolution speed of the hydrogen pump 103 further rises. Accordingly, instead of the target pressure of the regulating valve RG, the control unit 20 fixes the pump revolution speed Np to an appropriate revolution speed Nf at the required generated power Pth (S30). The target pressure Prg regulated by the regulating valve RG is then estimated according to the change of the required generated power Pr.

The necessary circulation quantity is first determined from the relationship (FIG. 5) between the required generated power Pr of the fuel cell and the circulation quantity necessary for the hydrogen pump 103 (S31). The inlet pressure of the hydrogen pump 103 is then estimated by referring to the relationship table such as shown in FIG. 6 from the established pump revolution speed Nf and the established necessary circulation quantity (S32). If the inlet pressure of the hydrogen pump 103 and the necessary circulation quantity are established, the pressure loss from the inlet of the fuel cell stack 10 to the inlet of the hydrogen pump 103 is determined by the relationship, for example, such as shown in FIG. 8 (S33). Therefore, the control unit 20 calculates as the target pressure Prg a value obtained by adding this estimated value of pressure loss to the inlet pressure of the hydrogen pump 103 (S34).

The control unit 20 updates the control signal so that the pressure in the circulation route is maintained at the target pressure Prg found by the above-described processing and so that the hydrogen pump 103 operates at the determined revolution speed (S40). Thus, the control unit 20 changes the air pressure so that the regulation quantity of the regulating valve RG becomes the target pressure Prg by controlling the control valves SV7 and SV6 so that the regulated pressure becomes the estimated target pressure Prg. The control unit 20 shuts down the shut-off valve SV6 once the target pressure has been reached, by referring, e.g., to the detection value of the pressure sensor p2. The pressure in the circulation route becomes the target pressure Prg as a result of this operation. Furthermore, the control unit 20 outputs the drive signal, such that the revolution speed of the hydrogen pump 103 becomes the constant revolution speed Nf, to the hydrogen pump 103. With such processing, the fuel cell system is controlled in a region on the right side of the standard value Pth shown in FIGS. 2A-C.

With the above-described Embodiment 2, in the region where the required generated power Pr is equal to or higher than the standard value Pth, the revolution speed of the hydrogen pump 103 is fixed, rather than increased, and the pressure in the circulation route is changed correspondingly the fluctuation of load. Therefore, the fuel cell system can be operated without a significant increase in power consumption associated with the increase in the pump revolution speed and the total power generation efficiency can be increased. Furthermore, because a low revolution speed can be maintained, the hydrogen pump can be reduced in size and the entire fuel system can be provided in a compact configuration.

Furthermore, in the region in which the required generated power Pr is less than the standard value Pth, the pressure in the circulation path is fixed and only the revolution speed of the hydrogen pump 103 is changed according to load fluctuations. Therefore, the control can be conducted in a simple manner. Thus, when the required generated power or circulation quantity drops, the control is conducted so as to decrease the revolution speed accordingly. Therefore, power consumption can be reduced in a rational manner according to the loading state of the system and the power generation efficiency of the entire system can be further increased.

Embodiment 3

Embodiment 3 of the present invention relates to a modification example of a method for controlling the target pressure Prg of the regulating valve RG and the revolution speed Np of the hydrogen pump with the control unit in the fuel cell system control method identical to that of Embodiment 2 described hereinabove.

Figure 10A:
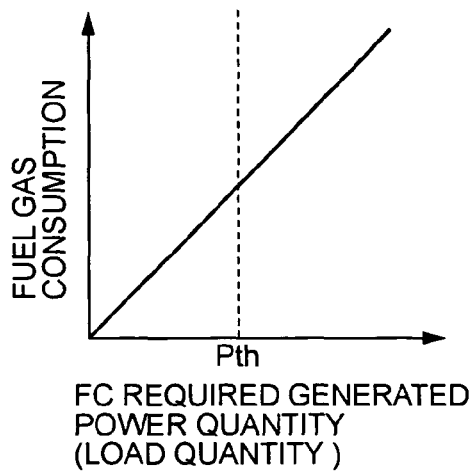
FIG. 10A illustrates the relationship between the fuel gas consumption quantity and the required load that explains the control method of Embodiment 3.
Figure 10B:
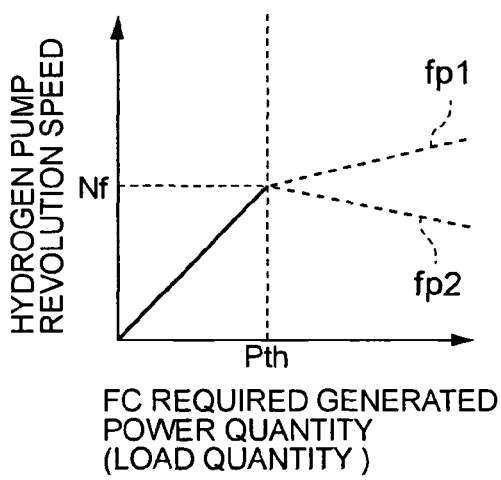
FIG. 10B is a control characteristic of pump revolution speed vs. required load.
Figure 10C:
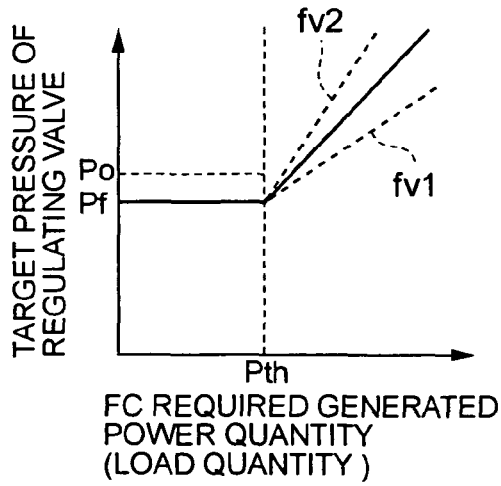
FIG. 10C is a control characteristic of target pressure of regulating valve vs. required load.

In Embodiment 3, when the required generated power Pr that is required for the fuel cell and the consumed quantity of the fuel gas correspond to each other as shown in FIG. 10A, the revolution speed of the hydrogen pump 103 is varied according to the characteristic such as shown in FIG. 10B and the target pressure of the regulating valve RG is varied according to the characteristic such as shown in FIG. 10C. In particular, in Embodiment 1, when the required generated power Pr was equal to or higher than the standard value Pth, the revolution speed of the hydrogen pump was set to a fixed value Nf. A specific feature of Embodiment 2 is that in this case the revolution speed of the hydrogen pump is either increased monotonously (fp1) or decreased monotonously (fp1), rather than set to a fixed value Nf.

In other words, if the revolution speed of the hydrogen pump increases, the consumed power rises rapidly, but when a margin is still present before the revolution speed of the hydrogen pump at the standard value Pth starts showing such a trend, it is not necessary to set the revolution speed to a fixed value immediately. In this case, the revolution speed may be raised gradually (fp1). At this time, the pressure is varied according to the required generated power Pr so that the target pressure Prg of the regulating valve RG makes up the deficiency of the circulation quantity corresponding to the increase rate of the revolution speed of the hydrogen pump that has become gradual, according to the flowchart such as shown in FIG. 9 (FIG. 10C, fv1). The slope of this variation curve is less than that in Embodiment 2.

On the other hand, the revolution speed of the hydrogen pump at the standard value Pth may be controlled so as to reduce the revolution speed in response to the increase in the required generated power Pr in the peak (fp2). At this time, the pressure is changed according to the required generated power Pr so that the target pressure Prg of the regulating valve RG makes up the deficiency of circulation quantity corresponding to the decrease of the revolution speed of the hydrogen pump that tends to decrease, according to the flowchart such as shown in FIG. 9 (FIG. 10C, fv2). The slope of this variation curve is naturally larger than that in Embodiment 2 or that of the pressure characteristic fv1 obtained when the revolution speed of the hydrogen pump was raised.

As shown in Embodiment 3, the operation effect of the present invention can be also demonstrated when both the revolution speed of the hydrogen pump and the target pressure of the regulating valve are changed, without fixing one of them.

Embodiment 4

Embodiment 4 of the present invention relates to another modification example of a method for controlling the target pressure Prg of the regulating valve RG and the revolution speed Np of the hydrogen pump in the fuel cell system control method identical to that of Embodiment 2 described hereinabove.

Figure 11A:
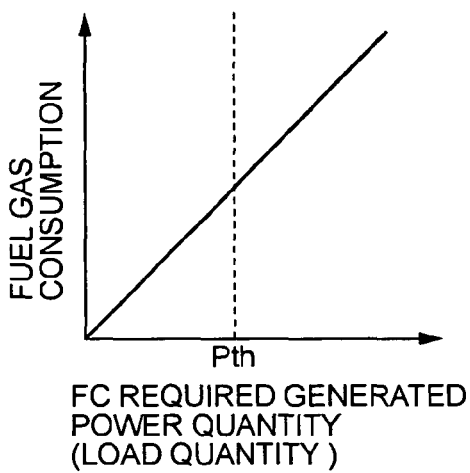
FIG. 11A illustrates the relationship between the fuel gas consumption quantity and the required load that explains the control method of Embodiment 4.
Figure 11B:
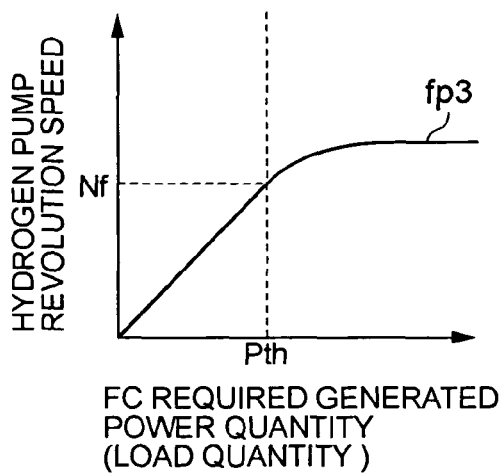
FIG. 11B is a control characteristic of pump revolution speed vs. required load.
Figure 11C:
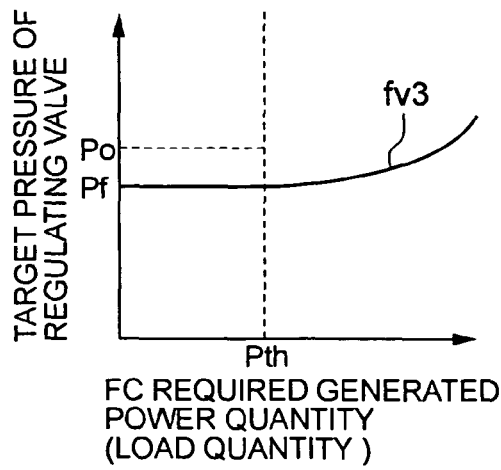
FIG. 11C is a control characteristic of target pressure of regulating valve vs. required load.

In Embodiment 4, when the required generated power Pr that is required for the fuel cell and the consumed quantity of fuel gas correspond to each other as shown in FIG. 11A, the revolution speed of the hydrogen pump 103 is changed according to the characteristic shown in FIG. 11B and the target pressure of the regulating valve RG is changed according to the characteristic shown in FIG. 11C. In particular, a specific feature of this embodiment is that in use of a standard value Pth as a reference for the required generated power Pr, the pump revolution speed and target pressure are changed gradually as asymptotes, without discontinuity points, rather than discontinuously.

In other words, when the required generated power Pr reaches the standard value Pth, the control unit 20 gradually converges the revolution speed of the hydrogen pump to a fixed value, as shown by fp3 in FIG. 11B. At this time, the target value Prg of the circulation route changes so as to make up the deficiency of circulation quantity caused by the change of the revolution speed of the hydrogen pump that converges gradually according to the flowchart such as shown in FIG. 9 (FIG. 11C, fv3).

Thus, with Embodiment 4, one of the revolution speed of the hydrogen pump and the target pressure of the regulating valve is gradually varied and converged, without being set discontinuously to a fixed value, and with this method, the operation effect of the present invention can be also demonstrated.

I claim:

1. A fuel cell system comprising:
   a fuel cell for generating power by circulating a fuel gas;
   a fuel gas supply source for supplying the fuel gas to the fuel cell;
   a circulation route for the fuel gas;
   drive means for circulating the fuel gas within the circulation route, the drive means disposed in the circulation route, the drive means forcibly circulating the fuel gas in the circulation route;
   pressure regulating means for regulating the pressure of the fuel gas in the circulation route to a predetermined pressure, the pressure regulating means being disposed outside of the circulation route; and
   control means for controlling a drive quantity of the drive means and variably regulating the pressure regulating means, wherein
   the control means is configured to make up for a deficiency of the fuel gas during a time period when power generation is high, according to a variation of a required gas quantity required in the fuel cell by regulating a pressure of the fuel gas in the circulation route with the pressure regulating means, while inhibiting a variation of the drive quantity in the drive means.

2. The fuel cell system according to claim 1, wherein said pressure regulating means raises the pressure of the fuel gas in said circulation route according to the increase in a required gas quantity that is required in said fuel cell.

3. The fuel cell system according to claim 1, wherein in a region in which at least the required gas quantity is higher than a standard value, the pressure regulation quantity of said pressure regulating means is varied correspondingly to a variation of said required gas quantity.

4. The fuel cell system according to claim 1, wherein in a region where said required gas quantity is higher than a standard value, a variation rate of the drive quantity of said drive means is reduced with respect to that of a region where said required gas quantity is lower than said standard value.

5. The fuel cell system according to claim 1, wherein in a region where said required gas quantity is lower than a standard value, a pressure regulation quantity of said pressure regulating means is maintained equal to or less than a constant value.

6. The fuel cell system according to claim 1, wherein said drive means is controlled based on said required gas quantity and a measured value of pressure inside said circulation route.

7. The fuel cell system according to claim 1, further comprising
   means for determining a drive characteristic of said drive means based on a generated power required for said fuel cell; and
   means for determining a pressure regulation quantity provided by said pressure regulating means based on said drive characteristic, which is set.

8. The fuel cell system according to claim 1, wherein in a region in which at least the required gas quantity is higher than a standard value, a drive quantity of said drive means is suppressed and a pressure regulation quantity of said pressure regulating means is varied so as to make up the deficiency of the drive quantity of said drive means.

9. The fuel cell system according to claim 1, wherein a pressure of said pressure regulating means can be regulated correspondingly to a variation of an air pressure controlled by opening and closing a pair of shut-off valves.

10. The fuel cell system according to claim 1, wherein said drive means is a pump, a compressor, or a turbine.

11. The fuel cell system according to claim 1, wherein said fuel gas supply source is a hydrogen tank filled with hydrogen.

12. The fuel cell system according to claim 1, wherein in a region in which at least the required gas quantity is higher than a standard value, a pressure regulation quantity of said pressure regulating means is varied monotonously.

13. The fuel cell system according to claim 1, wherein a pressure regulation quantity of said pressure regulating means is varied continuously and gradually from a region in which at least the required gas quantity is equal to or lower than a standard value to a region in which at least the required gas quantity is higher than said standard value.

14. The fuel cell system according to claim 1, wherein both a drive quantity of said drive means and a pressure regulation quantity of said pressure regulating means are varied in a region in which at least the required gas quantity is higher than a standard value.

15. A fuel cell system comprising:
   a fuel cell for generating power by circulating a fuel gas;
   a fuel gas supply source associated with the fuel cell to supply the fuel gas to the fuel cell;
   a circulation route for the fuel gas;
   a drive pump that circulates the fuel gas within the circulation route, the drive pump being disposed in the circulation route, the drive pump forcibly circulating the fuel gas in the circulation route;
   a pressure regulator that regulates the pressure of the fuel gas in the circulation route to a predetermined pressure, the pressure regulator being disposed outside of the circulation route; and a controller that controls a drive quantity of the drive pump and variably regulates the pressure regulator, and wherein the controller is configured to make up for a deficiency of the fuel gas during a time period when power generation is high, according to a variation of a required gas quantity required in the fuel cell by regulating a pressure of the fuel gas in the circulation route with the pressure regulator while inhibiting a variation of the drive quantity in the drive pump.

* * * * *